US009009740B2

(12) United States Patent
Jordahl et al.

(10) Patent No.: US 9,009,740 B2
(45) Date of Patent: Apr. 14, 2015

(54) INVOCATION OF ADDITIONAL PROCESSING USING REMOTE PROCEDURE CALLS

(75) Inventors: Thomas E Jordahl, Arlington, MA (US); Pamela L. Colwell, Wayland, MA (US); Matthew Butler, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 98 days.

(21) Appl. No.: 13/181,830

(22) Filed: Jul. 13, 2011

(65) Prior Publication Data

US 2014/0040924 A1    Feb. 6, 2014

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC ...................................... *G06F 9/547* (2013.01)

(58) Field of Classification Search
USPC ......................................................... 719/330
See application file for complete search history.

(56) References Cited

U.S. PATENT DOCUMENTS

| 7,624,397 | B1 * | 11/2009 | Washburn et al. ............. 719/315 |
| 2002/0107999 | A1 * | 8/2002 | Zimmermann et al. ....... 709/330 |
| 2003/0018832 | A1 * | 1/2003 | Amirisetty et al. ........... 709/328 |
| 2006/0123432 | A1 * | 6/2006 | Bendapudi et al. ........... 719/330 |
| 2008/0046582 | A1 * | 2/2008 | Beisiegel et al. ............. 709/230 |
| 2008/0313660 | A1 * | 12/2008 | Malik et al. .................. 719/330 |
| 2009/0293073 | A1 * | 11/2009 | Nathan et al. ................ 719/328 |
| 2010/0009747 | A1 * | 1/2010 | Reville et al. ................... 463/31 |
| 2010/0128866 | A1 * | 5/2010 | Irun-Briz et al. ......... 379/265.02 |
| 2011/0023009 | A1 * | 1/2011 | Brunswig et al. ............. 717/104 |
| 2011/0191792 | A1 * | 8/2011 | Kawakita ...................... 719/330 |

\* cited by examiner

*Primary Examiner* — Diem Cao
(74) *Attorney, Agent, or Firm* — Shook, Hardy & Bacon L.L.P.

(57) ABSTRACT

In one embodiment, a method for invoking additional processing at a remote computing device using remote procedure calls (RPCs) is provided. In this method, a list of functions supported by the remote computing device is received from the remote computing device. From the list of functions, a function that requires metadata about the function is identified. The metadata and argument required by the function is accessed, and an RPC message that includes the metadata and the argument is composed. The RPC message is then transmitted to the remote computing device. Here, the RPC message is transmitted to call the function with the argument as input and to invoke the additional processing based on the metadata.

22 Claims, 9 Drawing Sheets

INVOCATION OF ADDITIONAL PROCESSING USING REMOTE PROCEDURE CALLS

FIELD

The present disclosure relates generally to inter-process communication. In one example embodiment, the disclosure relates to the invocation of additional processing using remote procedure calls.

BACKGROUND

A remote procedure call (RPC) is a protocol that a program can use to request a service from a program located in another computing device on a shared network without a programmer explicitly coding details for this remote interaction. That is, RPC is an inter-process communication mechanism that enables data exchange and invocation of functionality residing in a different process. With RPC enabled, the programmer writes essentially the same code whether the subroutine is remote or local to the executing program.

RPC is especially well suited for client-server interaction where a requesting program is a client and a service-providing program is a server. The client can initiate an RPC by transmitting a request message to a remote server to execute a function with supplied parameters. In turn, the remote server can transmit a response to the client as a result of the execution of the requested function.

In standard RPC, the functions provided by a standard client run-time library have fixed application programming interfaces that require strict contracts for implementation. Particularly, other than the processing needed to move data to and from a client, a remote server cannot perform additional processing other than the processing resulting from the execution of the requested function. As a result, many existing RPC protocols cannot be integrated into, for example, existing enterprise systems that provide many different or additional functionalities that are not supported by standard RPC protocols.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Embodiments provide various techniques for invoking additional processing using remote procedure calls. One technique involves the addition of metadata to an RPC message. This metadata is different from parameters required in the execution of a function. As explained below, the metadata provides information about the invocation of processes that enable additional features, which are not supported by standard RPC protocols. The different types of additional processes that can be invoked are explained in more detail below.

Figure 1:
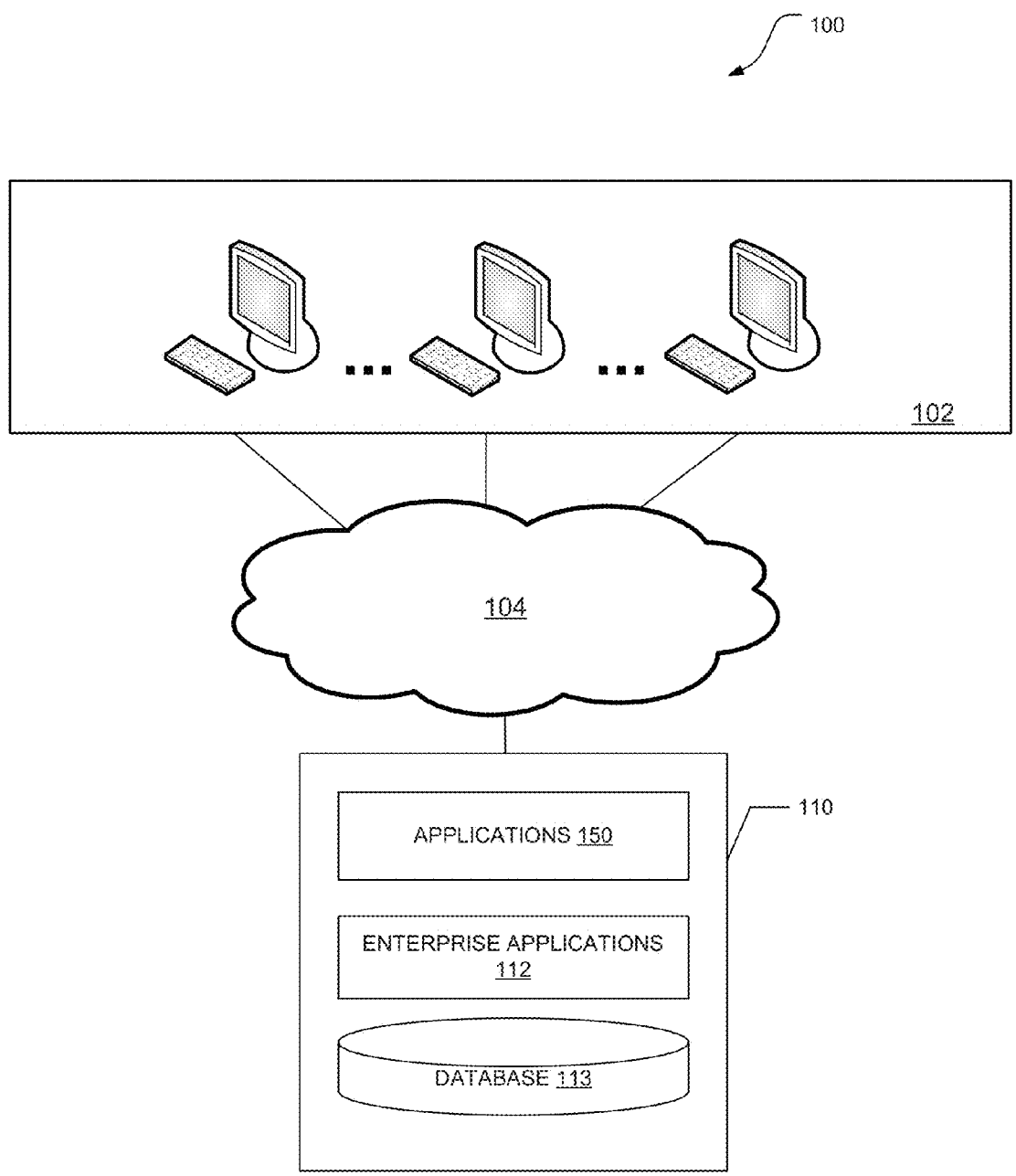
FIG. 1 is a block architectural diagram depicting an enterprise system, in accordance with an example embodiment, that can invoke additional processing using remote procedure calls.

FIG. 1 is a block architectural diagram depicting an enterprise system 100, in accordance with an example embodiment, that can invoke additional processing using remote procedure calls. The enterprise system 100 illustrates an example of a client-server database environment, which includes a server computing device 110 in communication with client computing devices 102 by way of a network 104. The server computing device 110 (e.g., an application/database server) may operate to receive, store, manage, and provide data, which may be received from sources such as client computing devices 102 or generated by the server computing device 110. As depicted, the server computing device 110 is configured to host various applications 150, enterprise applications 112, and a database 113.

The applications 150 running on the server computing device 110 are accessible from one or more client computing devices 102 (e.g., desktop computers, mobile phones, laptops, tablet computers, and personal digital assistants) through thin client interfaces, such as a Web browser. The applications 150 are computer programs that provide a variety of functionalities that may be based on the access of data stored in the database 113. Examples of applications 150 include social networking websites, video sharing websites, hosted services, web applications, and other applications.

Each of these applications 150 relies on one or more enterprise applications 112, which refer to the underlying structure supporting communications among units of work (also referred to as services) executed on behalf of the applications 150. An example of an enterprise application 112 is the ADOBE LIVECYCLE Data Services ES, which is a framework used in the development of various enterprise applications 112 that automate a broad range of business processes. Such enterprise applications 112 can, for example, provide data capture (e.g., create and deploy Extensible Markup Language (XML) based form templates such as ADOBE PDF or HyperText Markup Language (HTML) for use with the ADOBE READER, ADOBE FLASH Player, and web browsers), information assurance (e.g., digital signatures and rights management), document output (e.g., ADOBE PDF Generator, form generators, and output production prints), content services, and process management to deliver business processes such as account opening, services and benefits enrollment, correspondence management, requests for proposal processes, and other business-related workflows.

The applications 150 communicate with enterprise applications 112 over one or more interfaces provided by the enterprise applications 112. The applications 150 may, in turn, support client applications executed by client computing devices 102. Such a client application may, for example, include a Web browser to access and display reports generated by the applications 150. In this regard, the server computing device 110 may, for example, be a Web server that manages interactions with the client computing devices 102.

In this enterprise system 100, the server computing device 110 is configured to process RPCs. An RPC is a protocol that a program can use to request a service from a program located in another computing device on a shared network without a programmer explicitly coding details for this remote interaction. Particularly, an RPC is an inter-process communication mechanism that enables a program to cause a function (e.g., subroutine and procedure) to execute in another computing device on a shared network. In the enterprise system 100 depicted in FIG. 1, a client computing device 102 can initiate an RPC, thereby sending an RPC message to a known remote server computing device 110 requesting execution of a specified function with supplied parameters. The remote server computing device 110 may transmit a response to the client computing device 102 based on the execution of the function. Examples of RPC protocols include XML-RPC, Simple Object Access Protocol (SOAP), and Java Remote Method Invocation (JAVA-RMI).

In accordance with embodiments of the present invention, additional metadata may be included in one or more RPC messages transmitted from the client computing devices 102 to the server computing device 110. As explained in more detail below, in one embodiment, the metadata may be embodied as an annotation in a function definition. This metadata can invoke additional processing at the client computing devices 102 and/or server computing device 110, the additional processing of which is not supported by standard RPC protocols. As also explained in detail below, examples of additional processing include paging, load associated property on demand, notifications of modifications, change objects on updates, changes made to objects, and a variety of other different processes.

It should be appreciated that other system topologies may be used in conjunction with other embodiments, and that the computing devices 102 and 110 may include other elements that are not shown and may be used during operation thereof, such as any suitable program code, scripts, or other functional data that are executable to interface with other elements of the enterprise system 100, other applications, other data files, operating system files, and device drivers. Furthermore, two or more elements of the enterprise system 100 may be located remote from one another and may communicate with one another via the network 104 and/or a dedicated connection. Moreover, each displayed element of enterprise system 100 may comprise any number of hardware and/or software elements, some of which are located remote from each other element. The elements described herein as communicating with one another are directly or indirectly capable of communicating over any number of different systems for transferring data, including, but not limited to, shared memory communication, a local area network (LAN), a wide area network (WAN), a telephone network, a cellular network, a fiber-optic network, a satellite network, an infrared network, a radio frequency network, and any other type of network 104 that may be used to transmit information between computing devices. Additionally, communication between systems or computing devices (e.g., between client computing device 102 and server computing device 110) may proceed over any one or more transmission protocols that are or become known, such as Asynchronous Transfer Mode (ATM), Internet Protocol (IP), Hypertext Transfer Protocol (HTTP) and Wireless Application Protocol (WAP).

Figure 2:
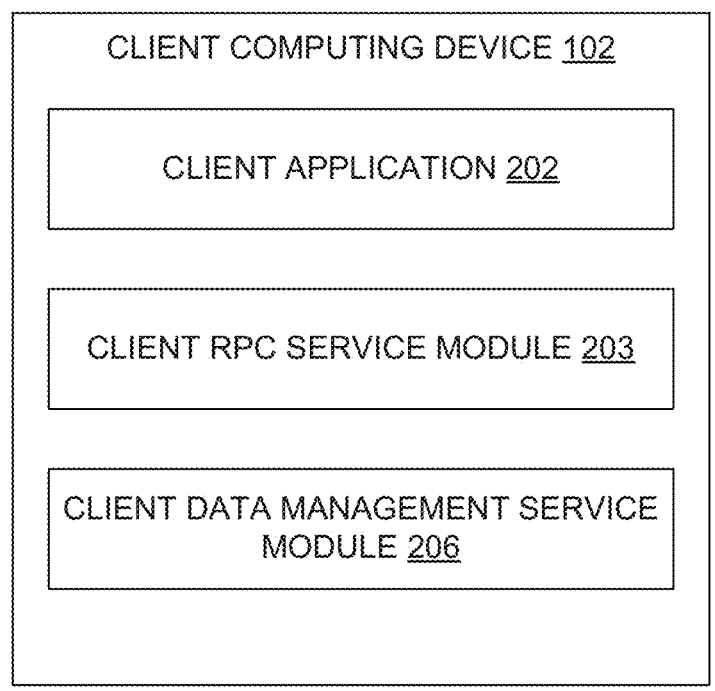
FIG. 2 depicts a block diagram of modules, in accordance with an embodiment, that may be included in one or more of the client computing devices depicted in FIG. 1.

FIG. 2 depicts a block diagram of modules, in accordance with an embodiment, that may be included in one or more of the client computing devices 102 depicted in FIG. 1. It should be appreciated that the client computing device 102 may be deployed in the form of, for example, a personal computer, a laptop computer, a tablet personal computer, a personal digital assistant, or other computing device. The client computing device 102 may form a part of an enterprise system, such as the enterprise system 100 depicted in FIG. 1. Referring to FIG. 2, in various embodiments, the client computing device 102 may be used to implement computer programs, logic, applications, methods, processes, or software to invoke additional processing using RPC, as described in more detail below.

As depicted in FIG. 2, the client computing device 102 includes client application 202, client RPC service module 203, and client data management service module 206. The client RPC service module 203 enables the client application 202 to make asynchronous requests to remote services that process the requests and then returns data directly to the client computing device 102. For example, the client application 202 can access data through client RPC service module 203 that includes HTTP GET or POST (HTTP services), SOAP (web services), or Java objects (remote object services). In an embodiment, the client RPC service module 203 can also embed metadata in RPC messages to invoke additional processing, which is explained in more detail below. In addition to calling a remote service, the client RPC service module 203 can store the response data from the service, from which the client application 202 can obtain the data.

The client data management service module 206 is configured to call methods on a server computing device. Additionally, this module 206 can also fill client-side data collections with data from remote data sources and synchronize the client and server versions of data. The client data management service module 206 can also automatically track changes made to the data at the client side using property change events, thereby allowing the creation of applications that work with distributed data. Large collections of data and nested data relationships, such as one-to-one and one-to-many relationships, can be managed using the client data management service module 206. Accordingly, by using the client data management service module 206, client applications 202 can be built that provide real-time data synchronization, data replication, on-demand data paging, and occasionally connected application services.

Figure 3:
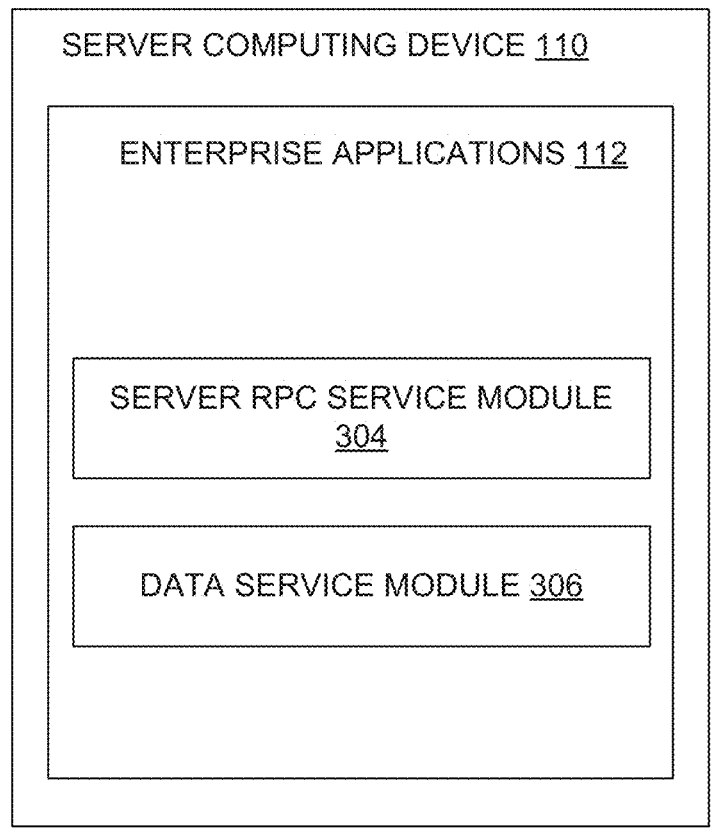
FIG. 3 depicts a block diagram of modules, in accordance with an embodiment, that may be included in the server computing device depicted in FIG. 1.

FIG. 3 depicts a block diagram of modules, in accordance with an embodiment, that may be included in the server computing device 110 depicted in FIG. 1. It should be appreciated that the server computing device 110 may be deployed in the form of, for example, an enterprise server, an application server, or other server computing devices. The server computing device 1110 may form a part of an enterprise system, such as the enterprise system 100 depicted in FIG. 1. Referring to FIG. 3, in various embodiments, the server computing device 110 may be used to implement computer programs, logic, applications, methods, processes, or software to process remote procedure calls, as described in more detail below.

As depicted in FIG. 3, the server computing device 110 is configured to host enterprise applications 112, which, in one example embodiment, include server RPC service module 304 and a data service module 306. When the server computing device 110 receives an RPC message, the server RPC service module 304 converts the RPC message from a network transmission format to a format required by the server computing device 110. Thereafter, the server RPC service module 304 calls the function, which is requested by the RPC message, in the server computing device 110. The function then executes, possibly generating output data, which the server RPC service module 304 may then return to the client computing device. Embodiments of the server RPC service module 304 can also extract metadata from the RPC message. As explained in more detail below, this metadata can be used to invoke additional processing that is otherwise not provided by the execution of the function.

The data service module 306 generally processes messages from a client computing device. For example, the data service module 306 may control the creation, maintenance, and the use of data stored in, for example a database. Particularly, the data service module 306 provides facilities for controlling data access, enforcing data integrity, and managing concurrency control. Additionally, the data service module 306 can invoke a variety of different processing performed on the input and/or output of the functions based on the extracted metadata, some of the processing of which are described below.

It should be appreciated that in other embodiments, the computing devices 102 and 110 may include fewer or more modules apart from those shown in FIGS. 2 and 3. For example, in an alternate embodiment, the server RPC service module 304 depicted in FIG. 3 can be instead embodied as two separate modules, namely an RPC module and a remote messaging service module. The modules 203, 206, 304, and 306 may be in the form of software that is processed by a processor. In another example, as explained in more detail below, the modules 203, 206, 304, and 306 may be in the form of firmware that is processed by application specific integrated circuits (ASICs), which may be integrated into a circuit board. Alternatively, the modules 203, 206, 304, and 306 may be in the form of one or more logic blocks included in a programmable logic device (for example, a field programmable gate array (FGPA)). The described modules 203, 206, 304, and 306 may be adapted, and/or additional structures may be provided, to provide alternative or additional functionalities beyond those specifically discussed in reference to FIGS. 2 and 3. Examples of such alternative or additional functionalities will be discussed in reference to the flow diagrams discussed below.

Figure 4:
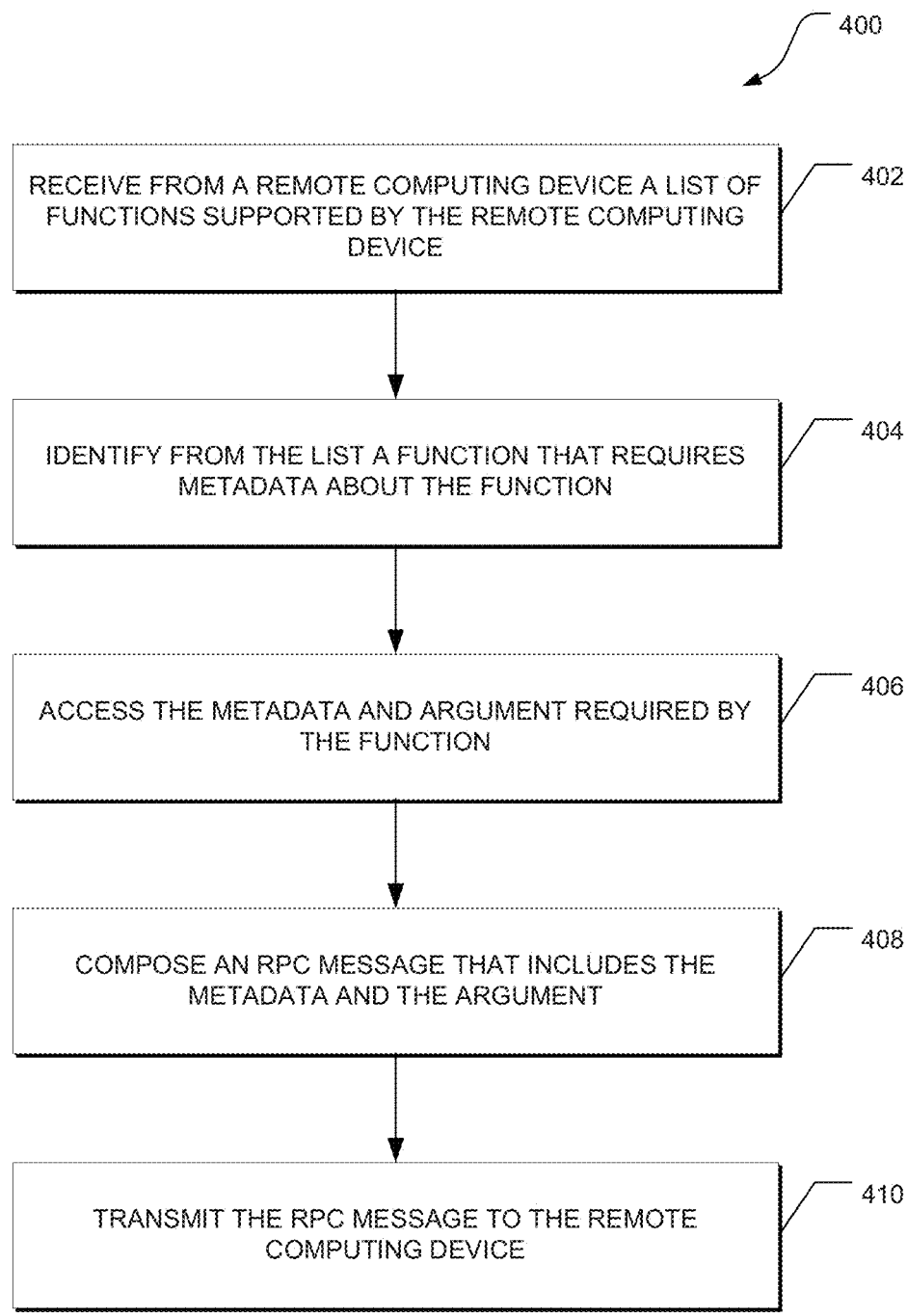
FIG. 4 depicts a flow diagram of a general overview of a method at, for example, the client computing device depicted in FIGS. 1 and 2, for invoking additional processing using RPC, in accordance with an example embodiment.

FIG. 4 depicts a flow diagram of a general overview of a method 400 at, for example, the client computing device depicted in FIGS. 1 and 2, for invoking additional processing using RPC, in accordance with an example embodiment. The method 400 may be implemented by the client RPC service module 203 and the client data management service module 206 and employed in the client computing device 102 depicted in FIG. 2. In FIG. 4, at 402, the client computing device receives from a remote computing device (e.g., a server computing device) a list of functions supported by the remote computing device. The list may be included in a client run-time library, which includes a mapping of client functions to remote functions. From this list, one or more functions that require metadata are identified at 404. As used herein, "metadata" refers to a set of data that describes or that gives information about additional processing associated with the function. Examples of metadata include object properties, page number, the name or names of properties that when combined provide a unique identity for an instance of an object, a notation of what type of operation will be performed when a specific RPC function is invoked (e.g., create, update, delete, read), a specific type of object that a particular function operates on (e.g., a delete function deletes an account object), and information about specific properties that were changed in an update operation, along with a copy of the original values of the change properties. This metadata is different from an argument required by the function. In particular, an "argument" refers to any expression within the parentheses of a function call, and is the value that is passed from a program application to the function call. Such an argument can also be considered as input to the function from the program from which it is called. Accordingly, in contrast to an argument, metadata cannot be an expression within the parentheses of a function call. Furthermore, a user defines a functional call and its arguments. In contrast, the metadata is defined by the client computing device (e.g., within the client run-time library).

In one embodiment, the list received from the remote computing device includes descriptions of the functions supported by the remote computing device. Alternatively, the descriptions may include or describe the metadata required by the functions. Accordingly, the function that requires metadata can be identified from the descriptions, and once the function is identified, the client computing device can then access the metadata and arguments required by the function at 406. The client computing device then composes an RPC message at 408 that includes both the metadata and the argument required by the function. As explained in more detail below, the metadata can, in one embodiment, be defined within a function definition. The client computing device then transmits the RPC message to the remote computing device at 410 to call the execution of the particular function at the remote computing device, which calls the function with the argument as input and also invokes additional processing based on the metadata.

Figure 5:
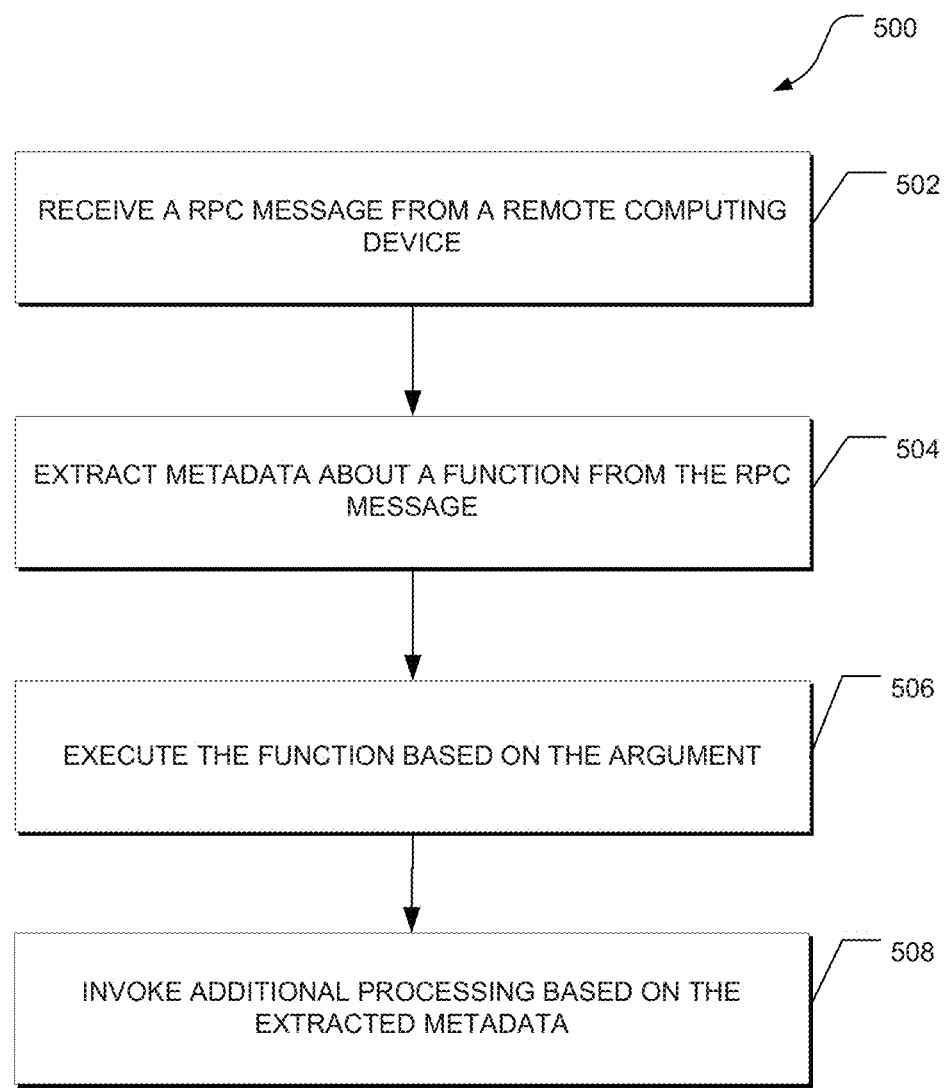
FIG. 5 depicts a flow diagram of a general overview of a method at, for example, the server computing device depicted in FIGS. 1 and 3, for processing RPCs at a server computing device, in accordance with an example embodiment.

FIG. 5 depicts a flow diagram of a general overview of a method 500 at, for example, the server computing device depicted in FIGS. 1 and 3 for processing RPCs at a server computing device, in accordance with an example embodiment. The method 500 may be implemented by the server RPC service module 304 and the data service module 306, and employed in the server computing device depicted 110 in FIG. 3. As depicted in FIG. 5, the server computing device receives an RPC message from a remote computing device (e.g., a client computing device) at 502. With the receipt of the RPC message, the server computing device at 504 extracts metadata from the RPC message about the function being called. In one embodiment, the server computing device extracts the metadata by parsing the RPC message and reading the metadata from the parsed RPC message from a location in the parsed RPC message that has been defined to include the metadata.

Thereafter, the server computing device executes the requested function at 506, based on arguments included in the function call. Additionally, the server computing device may invoke, at 508, additional processing based on the extracted metadata. It should be noted that this invocation of additional processing is separate from the execution of the function. In one embodiment, the additional processing is performed on the argument that is input into the function, and such additional processing before execution of the function is referred to as "pre-processing." For example, the metadata sent by the client computing device can be provided as context to the execution of a function.

In another embodiment, additional processing is performed on the output from the execution of the function, and such additional processing after the execution of the function is referred to as "post-processing." The server computing device can invoke a variety of different pre-processing and post-processing of data. As explained in more detail below, such processes can include paging, load associated property on demand, notifications of modifications, change objects on updates, changes made to objects, and a variety of other different processes.

Figure 6:
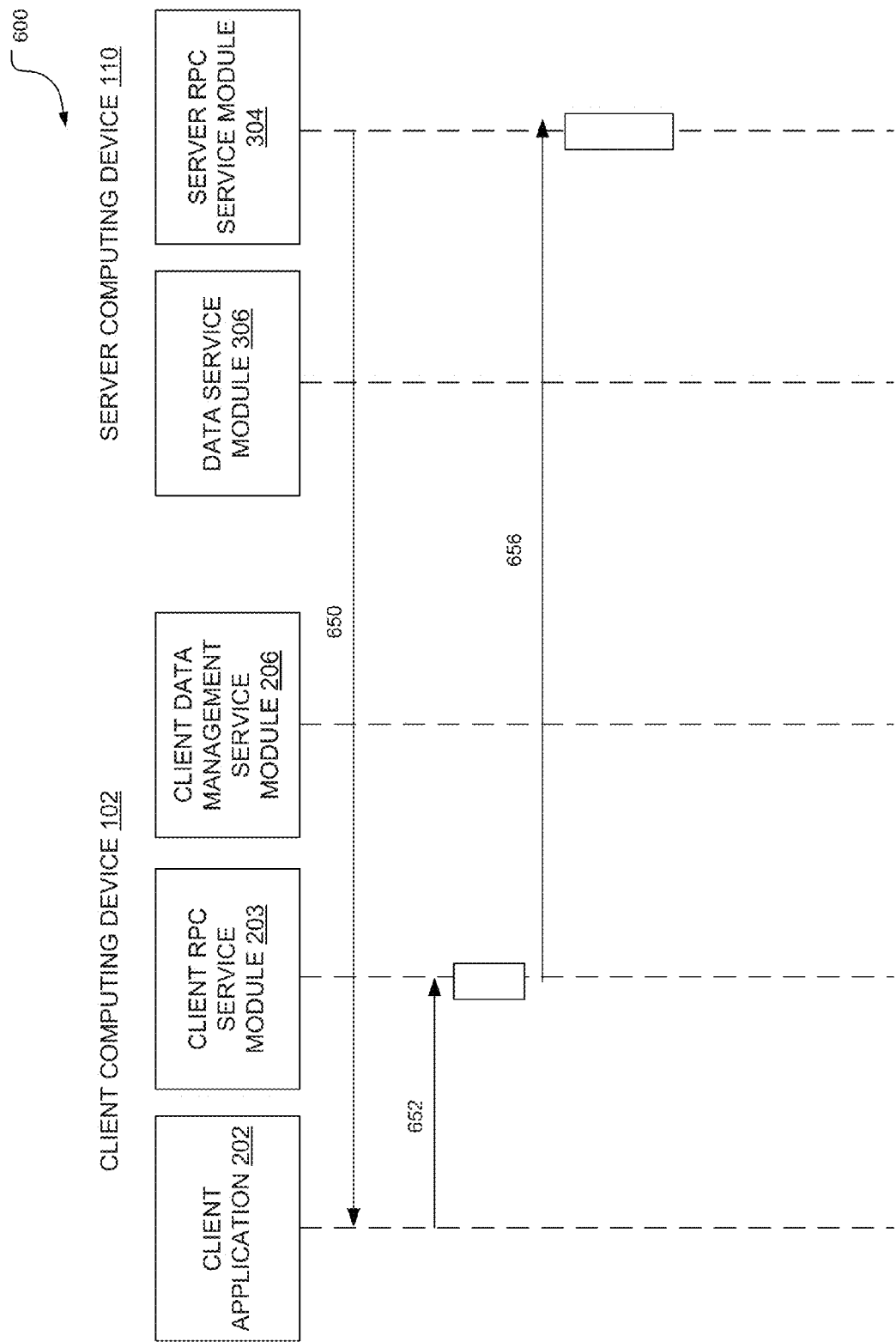
FIG. 6 depicts a timing diagram illustrating the transmittal of messages between the modules depicted in FIGS. 2 and 3 to invoke additional processing at a server computing device, in accordance with an example embodiment.

FIG. 6 depicts a timing diagram 600 illustrating the transmittal of messages between the modules depicted in FIGS. 2 and 3 to invoke additional processing at a server computing device, in accordance with an example embodiment. As depicted in FIG. 6, the timing diagram 600 depicts client application 202, client RPC service module 203, and client data management service module 206, all of which are associated with the client computing device 102. The timing diagram 600 additionally depicts data service module 306 and server RPC service module 304, all of which are associated with the server computing device 110.

Initially, the server RPC service module 304 transmits a list 650 of functions that are supported by the server computing device 110 to the client RPC service module 203. As explained above, this list 650 may be in the form of a client runtime library that includes a mapping of client functions to remote functions supported by the server computing device 110. It should be noted that this list 650 may not include all supported functions. Instead, the list 650 may include a number of functions that can be processed in a particular way by the client application 650. In one embodiment, the list 650 includes descriptions about the metadata that are required by one or more of the listed functions. For example, the description can define the particular metadata required for each function included in the list 650. As a result, the client RPC service module 203 can identify the metadata required for a function from the descriptions.

The client application 202 can make a call 652 for a local function. Instead of containing the actual code that implements the remote function, the client RPC service module 203 accesses or retrieves the required arguments from a client address space. The client RPC service module 203 also identifies the required metadata from the descriptions included in the received list and accesses or retrieves the required metadata. The client RPC service module 203 then composes an RPC message 656 calling a function, and this RPC message includes the metadata and the arguments required by the function. In one embodiment, the metadata may be added or included in a function definition, which includes a function declaration and a body of a function. For example, the metadata may be embodied as an annotation in a function definition. As used herein, an "annotation" provides data about a function that is not part of the function itself. Such annotations have no direct effect on the operation of the code they annotate. It should be appreciated that annotations can be applied to a function's declarations of classes, fields, methods, and other program elements. The following Table A depicts an annotation in JAVA that is embodied in a function definition:

TABLE A

```
@Delete
public void closeAccount (Account account) throws Exception
{
    If (account == null)
    {
        throw new Exception ("You forgot to specify an account. Try
            again.");
    }
    accountDAO.deleteAccount (account);
}
```

In JAVA, annotations are differentiated from other elements (e.g., class and interface) by an "@" symbol preceding the annotations. As depicted in Table A, an "@" symbol precedes the "Delete" keyword, thereby designating the "Delete" keyword as an annotation.

In an alternate embodiment, the metadata may be embodied or collected within a configuration file. An XML configuration file is an example of a configuration file where a user may create such an XML configuration file to store his preferences and, in this embodiment, also the metadata.

The client RPC service module 203 then calls the function in the client runtime library and transmits the RPC message 656 requesting the function to the server computing device 110 by way of the client data management service module 206. At the server computing device 110, the data service module 306 receives the RPC message 656 and forwards it to the server RPC service module 304. It should be appreciated that the data service module 306 is configured to processes messages from the client application 202. Here, the data service module 306 converts messages from their binary form to an internal message form. After the conversion, the data service module 306 examines the messages to determine which service and destination within the service to route each message.

Still referring to FIG. 6, the server RPC service module 304 then extracts the metadata from the RPC message and invokes additional pre-processing and/or post-processing based on the extracted metadata. As an example, the RPC service module 304 may invoke additional pre-processing on the input arguments before the server computing device 110 executes the function. In another example, the server RPC service module 304 may invoke additional post-processing on the output from an executed function.

It should be noted that in alternative embodiments, the client RPC service module 203 and the server RPC service module 304 can communicate with each other directly without going through the client data management service module 206 and the data service module 306. As a result, in this alternate embodiment, the client RPC service module 203 can transmit the RPC message 656 directly to the server RPC service module 304, and in response, the server RPC service module 304 can transmit a response message directly to the client RPC service module 203.

Figure 7:
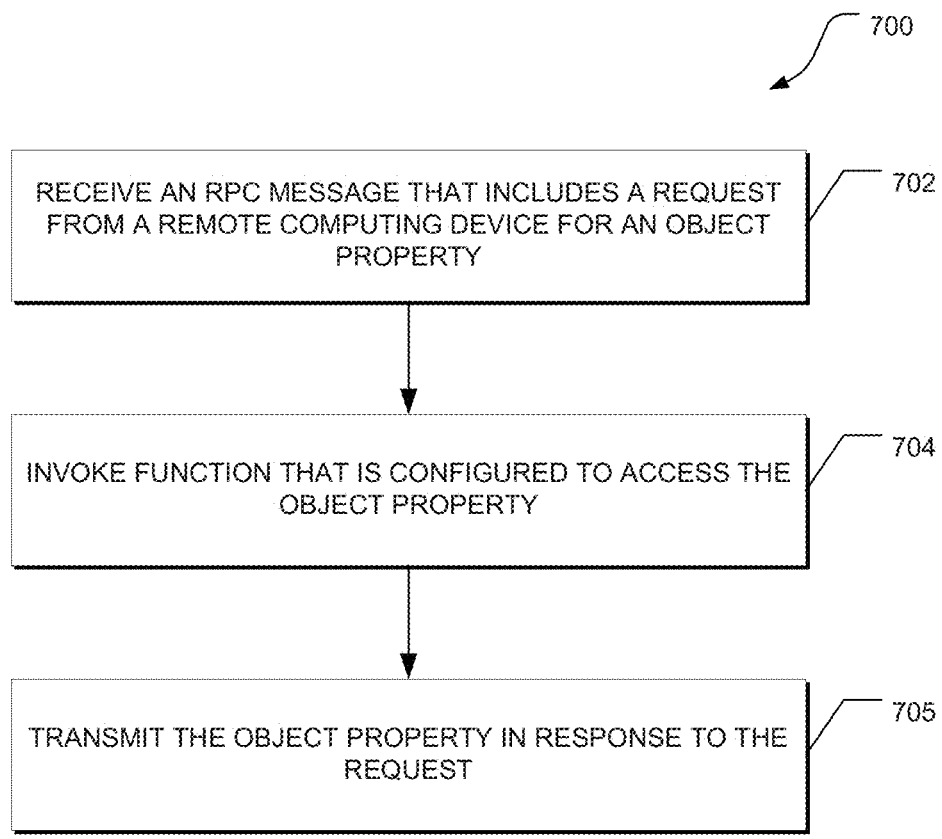
FIG. 7 depicts a flow diagram of a general overview of a method for invoking a type of additional processing, as generally described in FIG. 5, in accordance with an example embodiment.

FIG. 7 depicts a flow diagram of a general overview of a method 700 for invoking a type of additional processing, as generally described in FIG. 5, in accordance with an example embodiment. The method 700 may, for example, be implemented by the server RPC service module 304 as embodied in the server computing device 110 depicted in FIG. 3. One example of additional processing that can be invoked is loading object properties on demand. It should be appreciated that a "property" of an object refers to a variable of an object. An example of such a property is a relationship of an object to other objects. Instead of transmitting all object properties, a client computing device can request certain object properties from a server computing device. Here, the client computing device can transmit an RPC message to a server computing device with metadata having instructions to transmit a particular object property. That is, the server computing device can interpret the metadata as an instruction to transmit a particular object property.

For example, a client computing device can transmit a request to a server requesting for a collection of objects. In response, the server computing device transmits some, but not all, the properties of the requested objects to the client computing device. The client computing device then requests a property value that was not transmitted to the client computing device in the original request. In particular, the client RPC service module, for example, may automatically invoke the correct function on the server computing device, as indicated in the metadata, to retrieve the property value from the server computing device. As depicted in FIG. 7, upon receipt of the request as embodied in an RPC message at 702, the server computing device invokes the requested function that can access the requested object property at 704. Instead of transmitting all properties of a particular object, the server computing device, at 705, transmits only the requested object property to the client computing device in response to the request from the RPC message.

Figure 8:
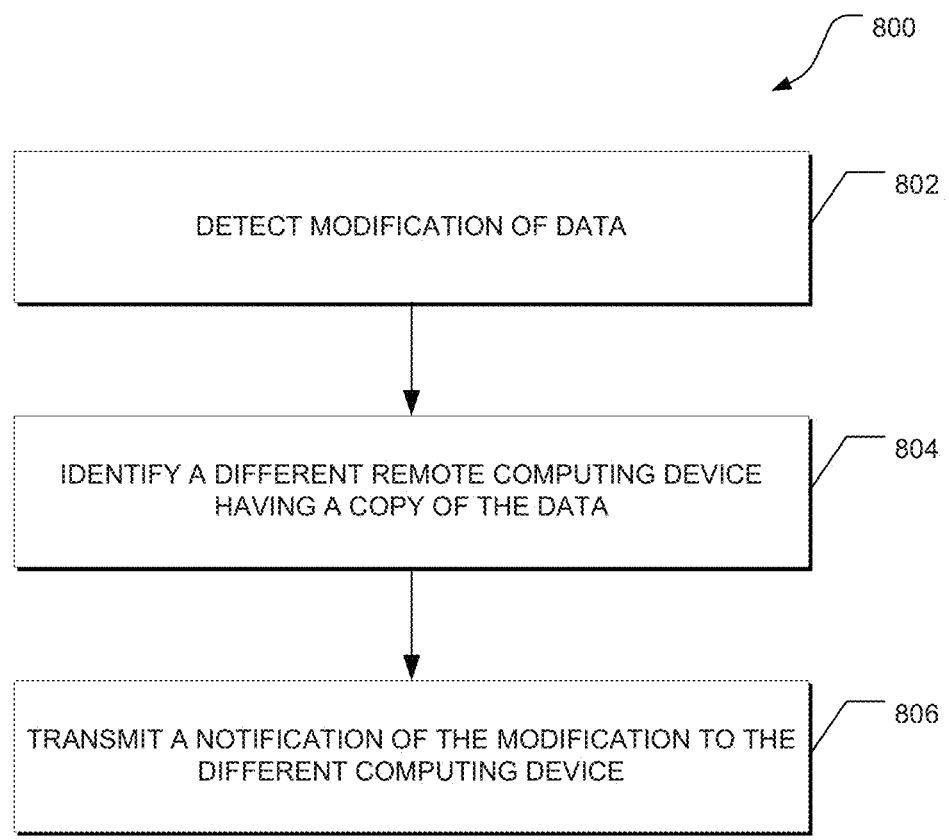
FIG. 8 depicts a flow diagram of a general overview of a method for invoking another type of additional processing, as generally described in FIG. 5, in accordance with an another example embodiment.

FIG. 8 depicts a flow diagram of a general overview of a method 800 for invoking another type of additional processing, as generally described in FIG. 5, in accordance with another example embodiment. The method 800 may, for example, be implemented by the server RPC service module 304 as embodied in the server computing device 110 depicted in FIG. 3. Another example of additional processing that can be invoked is the change notification. In particular, a server computing device can track modifications made to data based on the execution of functions, and upon detection of a modification, the server computing device can transmit immediate notifications to all connected client computing devices that have copies of the same data. In this embodiment, the client computing device can transmit an RPC message to a server computing device with metadata having instructions to transmit a notification of data modification to other client computing devices having copies of the data if the data has been modified.

As depicted in FIG. 8, upon receipt of the RPC message with such instructions, the server computing device is configured to detect a modification of data at 802 and identify one or more different client computing devices that have copies of the same data at 804. If a modification is detected, the server computing device transmits, at 806, notifications of the modification to all the identified client computing devices having copies of the same data. The client computing devices that receive such notifications may then take various actions regarding the modified data, such as blocking the data from being modified or notifying the user that the data has been modified.

In addition to the additional processing described in FIGS. 7 and 8, the server computing device (as well as the client computing device) can also invoke other processing. In yet another embodiment, paging can be invoked where a collection of data can be broken up into "pages," which are subsets of data that are transmitted when requested by the client computing device. As an example, in a list of data, only the first ten elements of the data are visible to the client computing device. As a result, the client computing device does not need the entire data set. The client computing device can therefore request additional "pages" from the server computing device when the user scrolls down the list. In this example, the metadata included in an RPC message can define a subset of data to be included in a response. An example of such a subset definition can include a range, such as a page range (e.g., pages 1-10). Upon receipt of such a request, the server computing device accesses and transmits only the subset of data in a response to the client computing device, which requested the subset.

In still another embodiment, automatic updates of modified data can be invoked where modifications made to objects resulting from the execution of a function can be tracked. The server computing device that tracks the modifications can automatically push the modification to other client computing devices that have copies of the same data. These other client computing devices can update their copies of the data accordingly. In this example, the metadata included in an RPC message can include instructions to track modifications made by the execution of a function, which is requested in the RPC message.

Figure 9:
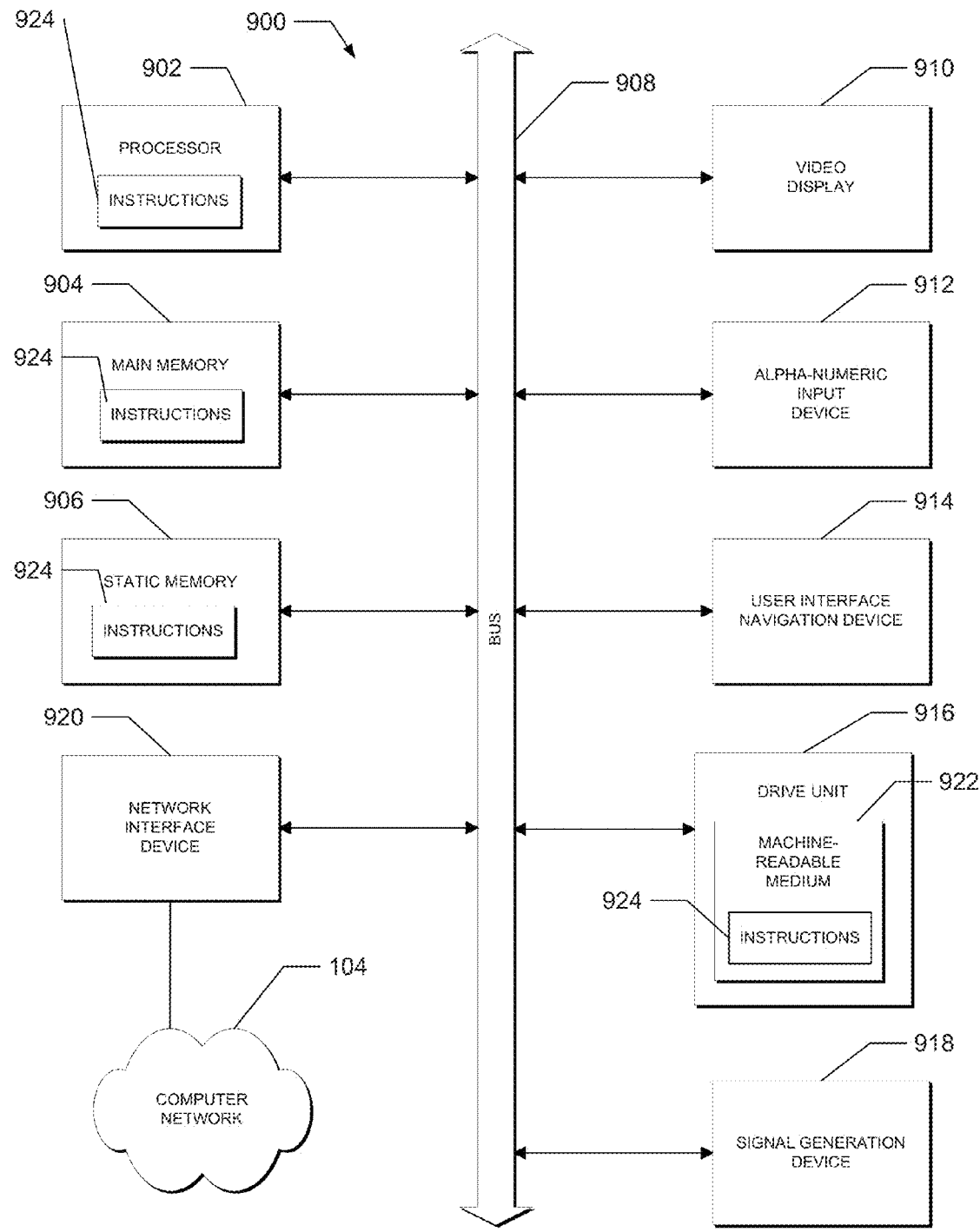
FIG. 9 depicts a block diagram of a machine in the example form of a computing device, such as the computing devices depicted in FIG. 2 and FIG. 3, within which may be executed a set of instructions for causing the machine to perform any one or more of the methodologies discussed herein.

FIG. 9 depicts a block diagram of a machine in the example form of a computing device 900, such as the computing devices 102 and 110 depicted in FIG. 2 and FIG. 3, respectively, within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

As depicted in FIG. 9, the machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 900 includes a processor 902 (e.g., a central processing unit (CPU), a graphics processing unit (GPU) or both), a main memory 904 (e.g., random access memory), and a static memory 906 (e.g., static random-access memory), which communicate with each other via bus 908. The computing device 900 may further include video display unit 910 (e.g., a plasma display, a liquid crystal display (LCD) or a cathode ray tube (CRT)). The computing device 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 (a type of non-volatile memory storage) includes a machine-readable medium 922 on which is stored one or more sets of data structures and instructions 924 (e.g., software) embodying or utilized by any one or more of the methodologies or functions described herein. The data structures and instructions 924 may also reside, completely or at least partially, within the main memory 904 and/or within the processor 902 during execution thereof by computing device 900, with the main memory 904 and processor 902 also constituting machine-readable, tangible media.

The data structures and instructions 924 may further be transmitted or received over a computer network 104 via network interface device 920 utilizing any one of a number of well-known transfer protocols (e.g., HTTP).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 900) or one or more hardware modules of a computer system (e.g., a processor 902 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a FPGA or an ASIC) to perform certain operations. A hardware module may also comprise programmable logic or circuitry (e.g., as encompassed within a general-purpose processor 902 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 902 configured using software, the general-purpose processor 902 may be configured as respective different hardware modules at different times. Software may accordingly configure a processor 902, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine, but deployed across a number of machines. In some example embodiments, the processors 902 may be located in a single location (e.g., within a home environment, an office environment or as a server farm), while in other embodiments the processors 902 may be distributed across a number of locations.

While the embodiment(s) is (are) described with reference to various implementations and exploitations, it will be understood that these embodiments are illustrative and that the scope of the embodiment(s) is not limited to them. In general, techniques invoking additional processes using RPC may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method comprising:
 receiving at a client device, from a server device a list of functions supported by the server device and a mapping of functions of the client device to the functions supported by the server device, the functions having associated metadata that describes additional processing associated with the functions not supported by standard RPC calls, wherein the metadata is defined by the client device;
 identifying at the client device, from the list of functions, a function;
 accessing at the client device, the metadata associated with the function and an argument required by the function;
 composing at the client device, an RPC message that comprises the metadata and the argument; and
 transmitting at the client device, the RPC message to the server device, the RPC message being transmitted to call the function with the argument as input and to use the metadata to invoke the additional processing that is otherwise not provided by execution of the function, the additional processing comprising an additional pre-processing on the argument before the server device executes the function and/or an additional post-processing on the output from the function.

2. The method of claim 1, wherein the RPC message includes a function definition, and wherein the metadata is embodied as an annotation in the function definition.

3. The method of claim 1, wherein the RPC message includes a function definition, and wherein the composing of the function comprises adding the metadata to the function definition.

4. The method of claim 1, wherein the additional processing is performed on the argument required by the function.

5. The method of claim 1, wherein the additional processing includes paging, load associated property on demand, notification of modifications, changed objects on updates, or changes made to objects.

6. The method of claim 1, further comprising receiving a response to the transmittal of the RPC message based on an execution of the function at the server device, wherein the response comprises data, and wherein the metadata defines a subset of the data to include in the response.

7. The method of claim 1, further comprising receiving a response to the transmittal of the RPC message, wherein the metadata comprises an instruction to the server device to transmit an object property in the response when referenced by the client device.

8. The method of claim 1, wherein the metadata comprises an instruction to the server device to transmit a notification of data modification to another server device having a copy of the data if the data has been modified.

9. The method of claim 1, wherein the metadata comprises an instruction to the server device to track a modification made to data stored on the server device.

10. A method comprising:
sending, at a server device, to a client device a list of functions supported by the server device and a mapping of functions of the client device to the functions supported by the server device, the functions having associated metadata that describes additional processing associated with the functions not supported by standard RPC calls, wherein the metadata is defined by the client device;
receiving, at the server device, an RPC message from the client device, the RPC message calling an execution of a function and including metadata about the function and argument required for an execution of the function;
extracting, at the server device, the metadata about the function from the RPC message;
utilizing the metadata to invoke the additional processing that is otherwise not provided by execution of the function; and
executing, at the server device, the function based on the argument, the additional processing comprising an additional pre-processing on the argument before the server device executes the function and/or an additional post-processing on the output from the function.

11. The method of claim 10, wherein the invocation of the additional processing comprises processing the argument as input into the function.

12. The method of claim 10, wherein the invocation of the additional processing includes paging, load associated property on demand, notification of modifications, changed objects on updates, or changes made to objects.

13. The method of claim 10, wherein the RPC message includes a function definition, and wherein the metadata is embodied as an annotation in the function definition.

14. The method of claim 10, wherein the executing of the function generates data, wherein the meta data defines a subset of the data to include in the response, and wherein the invocation of the additional processing comprises transmitting the subset of the data in a response to the client device.

15. The method of claim 10, wherein the metadata comprises an instruction to invoke a different function that is configured to access an object property, and wherein the invocation of additional processing comprises:
receiving, at the server device, a request from the client device to invoke the different function;
invoking, at the server device, the different function to access the object property; and
transmitting the object property in a response to the client device based on receipt of the request.

16. The method of claim 10, wherein the metadata comprises an instruction to transmit a notification of data modification to a different server device having a copy of the data if the data has been modified, and wherein the invocation of the additional processing comprises:
detecting a modification of the data;
identifying the different server device having the copy of the data; and
transmitting the notification to the different server device.

17. The method of claim 10, wherein the metadata comprises an instruction to track a modification made to data stored at the server device, and wherein the invocation of the additional processing comprises tracking the modification made to the data.

18. A non-transitory, machine-readable medium that stores instructions, which, when performed by a machine, cause the machine to perform operations comprising:
receiving, at a client device, from a server device a list of functions supported by the remote computing device and a mapping of functions of the client device to the functions supported by the server device, the functions having associated metadata that describes additional processing associated with the functions not supported by standard RPC calls, wherein the metadata is defined by the client device;
identifying, from the list of functions, a function;
accessing the metadata associated with the function and an argument required by the function;
composing a remote procedure call (RPC) message that comprises the metadata and the argument; and
transmitting the RPC message to the server device, the RPC message being transmitted to call the function with the argument as input and to use the metadata to invoke the additional processing that is otherwise not provided by execution of the function, the additional processing comprising an additional pre-processing on the argument before the server device executes the function and/or an additional post-processing on the output from the function.

19. The non-transitory, machine-readable medium of claim 18, wherein the RPC message includes a function definition, and wherein the metadata is embodied as an annotation in the function definition.

20. The non-transitory, machine-readable medium of claim 18, wherein the RPC message includes a function definition, and wherein the operation of composing the function comprises adding the metadata to the function definition.

21. An enterprise system comprising:
a client device comprising:
at least one processor; and
a memory in communication with the at least one processor, the memory being configured to store a client remote procedure call (RPC) service module that is executable by the at least one processor, the client RPC service module having instructions that when executed by the at least one processor, cause operations to be performed, the operations comprising:
receiving from a server device a list of functions supported by the server device and a mapping of functions of the client device to the functions supported by the server device, the functions having associated metadata that describes additional processing associated with the functions that is not supported by standard RPC protocols, wherein the metadata is defined by the client device;

identifying, from the list of functions, a function that requires metadata about the function;

accessing the metadata associated with the function and an argument required by the function;

composing an RPC message that comprises the metadata and the argument; and transmitting the RPC message to the server device, the RPC message being transmitted to call the function on the remote computing device and to use the metadata to invoke the additional processing that is otherwise not provided by execution of the function, the additional processing comprising an additional pre-processing on the argument before the server device executes the function and/or an additional post-processing on the output from the function.

22. The enterprise system of claim 21, further comprising:

the server device comprising:

at least one processor; and a memory in communication with the at least one processor, the memory being configured to store a server RPC service module that is executable by the at least one processor, the server RPC service module having instructions that when executed by the at least one processor, cause operations to be performed, the operations comprising:

receiving an RPC message from the client device, the RPC message calling an execution of a function and includes metadata about the function and argument required for an execution of the function;

extracting the metadata about the function from the RPC message;

performing an operation based on the metadata; and executing the function based on the argument.

* * * * *